May 26, 1936.  H. E. WISE  2,042,417
ROLLER BEARING
Filed June 18, 1932  4 Sheets-Sheet 1
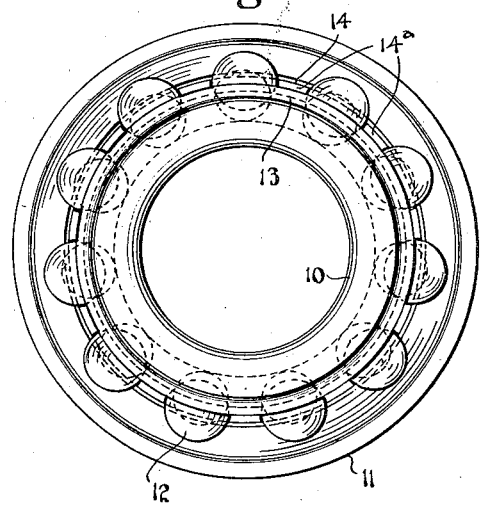
Fig.1
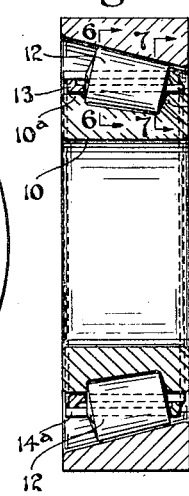
Fig.2
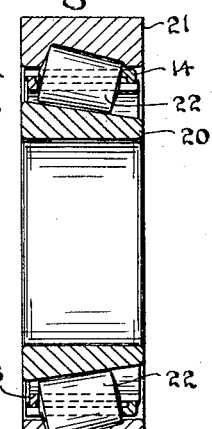
Fig.3
Fig.5
Fig.4
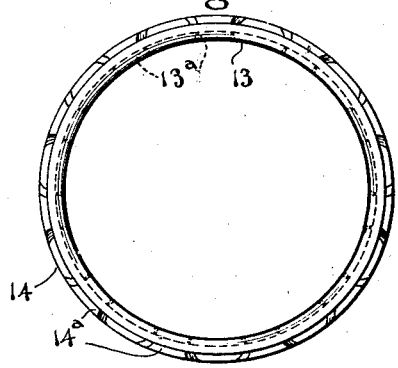
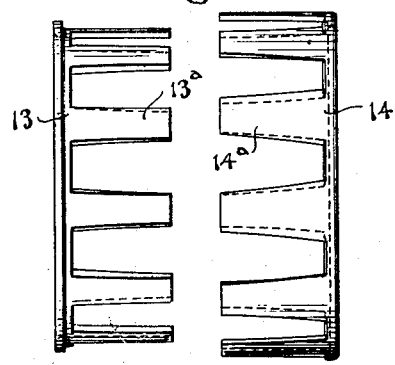
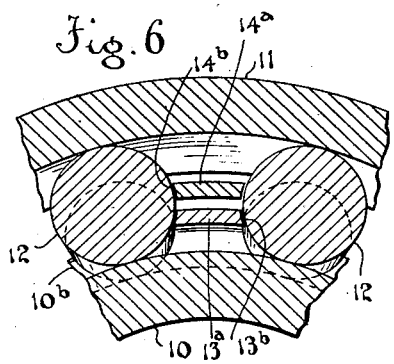
Fig.6
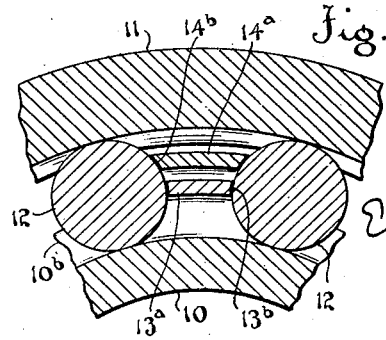
Fig.7
INVENTOR
Harry E. Wise
Ely
Barrow
ATTORNEYS

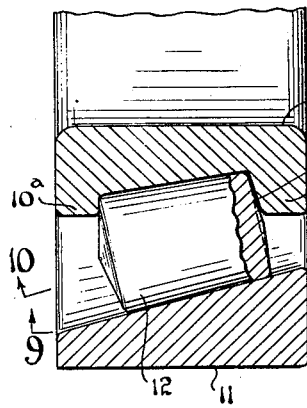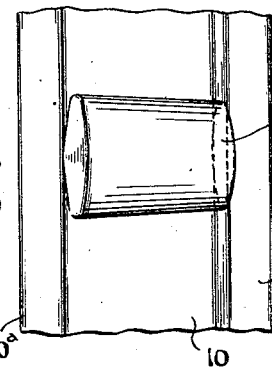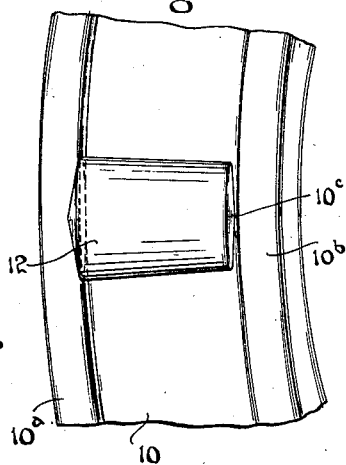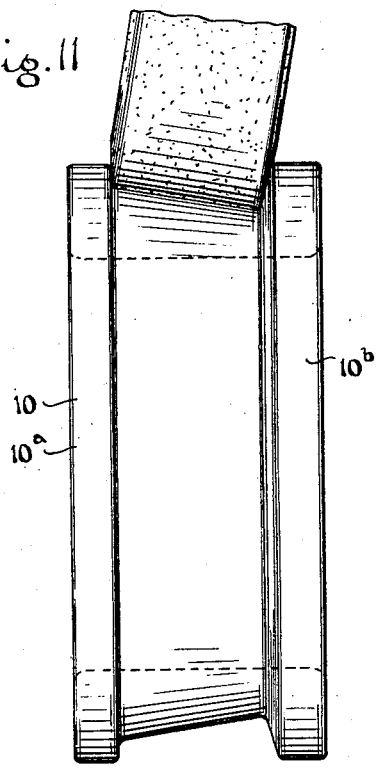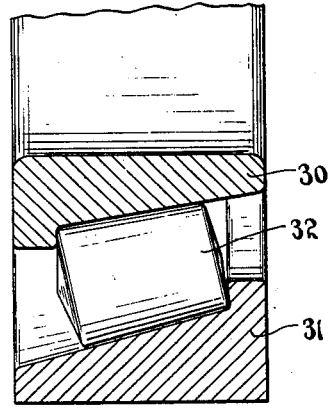

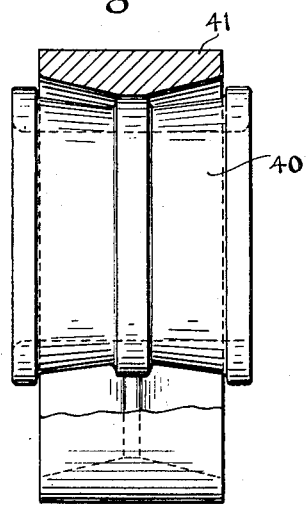
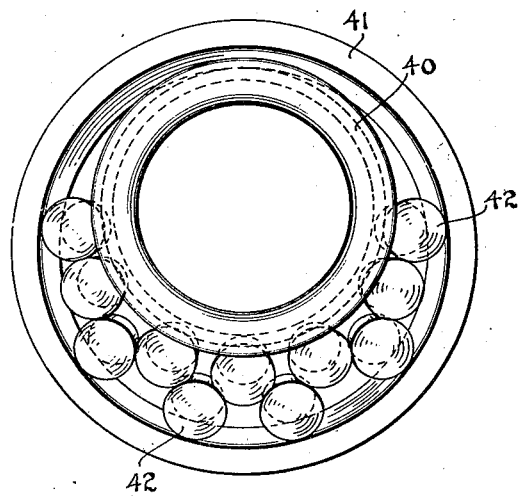
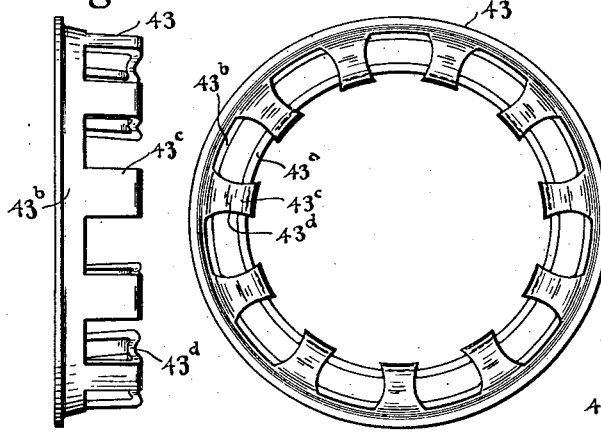
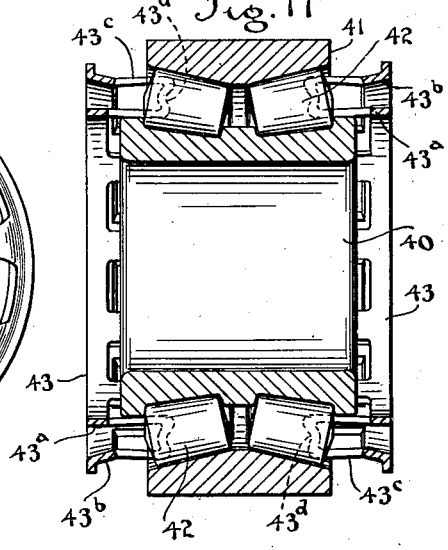

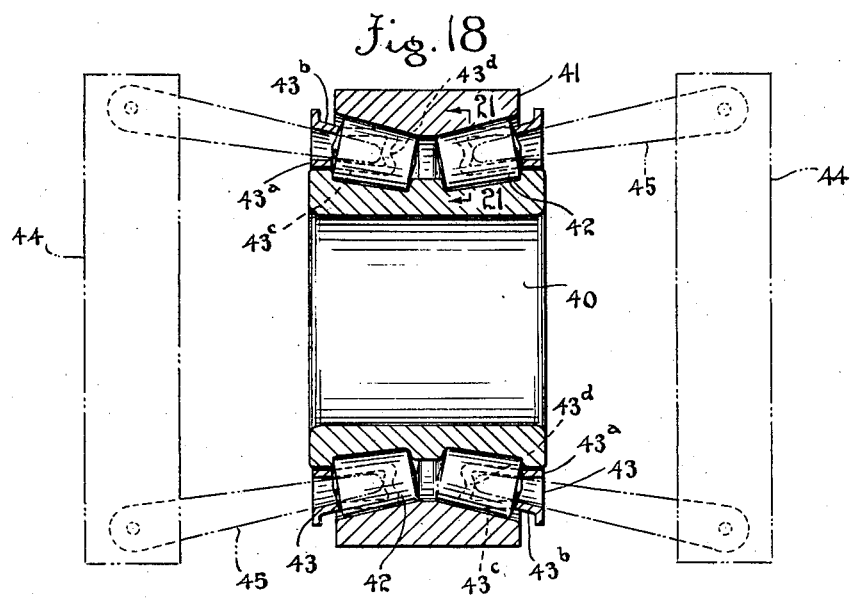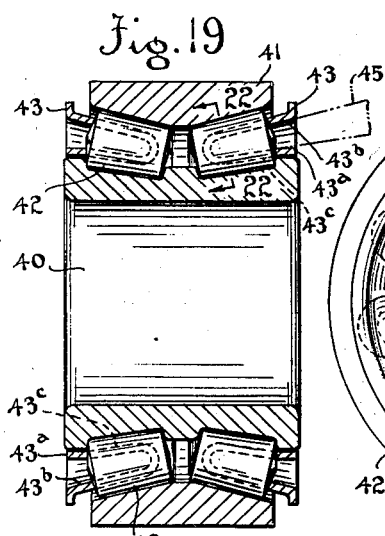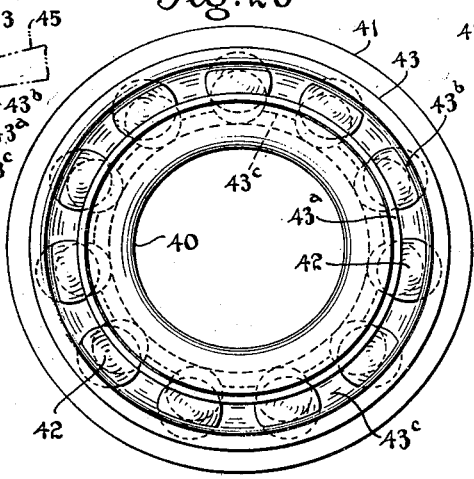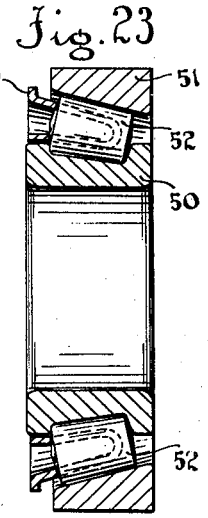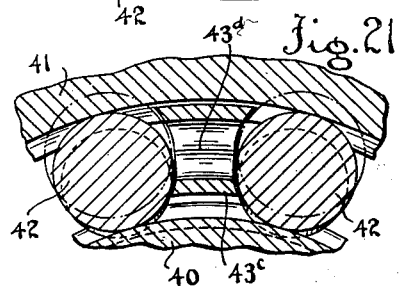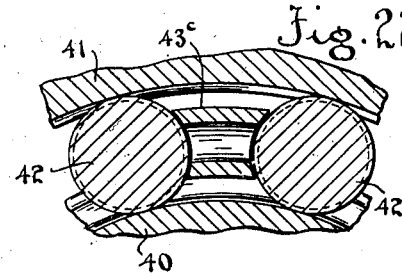

Patented May 26, 1936

2,042,417

UNITED STATES PATENT OFFICE 2,042,417

ROLLER BEARING

Harry E. Wise, Canton, Ohio, assignor of ninety one-hundredths to Alfred F. Curtis, Alliance, Ohio Application June 18, 1932, Serial No. 617,922

10 Claims. (Cl. 29—84)

This invention relates to tapered roller bearing constructions.

Heretofore in the construction of tapered roller bearings, the end faces of the rollers and the pressure or load sustaining and guiding ribs of the races have had to be especially designed to provide effective guiding and load-sustaining contacts because the clearance between the end faces of the rollers and the ribs is quite large, and because one rib, usually the pressure rib, is quite low to facilitate assembly. These rib-roller contacts have not been entirely satisfactory, however, because of scoring in service due to sharp edges of the rollers cutting through the lubricant.

The general purpose of the present invention is to provide improved tapered roller bearing constructions in which the clearance between the rollers and the ribs may be reduced to a minimum and in which relatively high ribs may be employed on the races with the ribs and roller end faces so shaped that the rib-roller contacts are substantially radial and substantially central at both end faces of the rollers whereby no sharp roller edges are presented to the ribs to cut through the lubricant.

The invention also has for its object the provision for rolling contact between the end faces of the rollers and the rib-roller faces.

The invention also has for its object the provision of improved cages for use with roller bearings which may be associated with the bearings after assembly of the rollers in the races and accordingly which will permit the use of relatively high race ribs with minimum rib-roller clearance.

The foregoing and other objects of the invention are attained in the roller bearings illustrated in the accompanying drawings and described below. It is to be understood that the invention is not limited to the specific form thereof shown and described.

Of the accompanying drawings,

Figure 1 is an end view of a roller bearing embodying the invention;

Figure 2 is a diametral section more or less diagrammatic through said bearing;

Figure 3 is a view similar to Figure 2 of a modified form of bearing;

Figure 4 is an elevation of a two-piece cage construction embodying the invention with the cage parts arranged in aligned but separated positions such as they assume on opposite sides of a bearing before assembly;

Figure 5 is an end view of the cage as shown in Figure 4;

Figure 6 is a section on line 6—6 of Figure 2;

Figure 7 is a section on line 7—7 of Figure 2;

Figure 8 is an enlarged radial sectional view (omitting cage) of the bearing shown in Figure 2 showing the shapes of the rollers and ribs whereby central radial contacts are secured on both ribs;

Figure 9 is a view on line 9—9 of Figure 8;

Figure 10 is a view on line 10—10 of Figure 8;

Figure 11 illustrates how the inner race of the bearing shown in Figures 1, 2 and 6 to 10 may be formed;

Figure 12 is a radial section through a modified form of the invention;

Figure 13 is a side view, partly broken away, and in section, of the inner and outer race of a double opposed tapered roller bearing construction in the first step of assembly;

Figure 14 is an end view thereof with rollers inserted;

Figure 15 is a side view of another form of cage embodying the invention prior to assembly with a bearing;

Figure 16 is an inner end view thereof;

Figure 17 illustrates said cages being positioned for assembly with the bearing illustrated in Figures 13 and 14;

Figure 18 is a radial section through said bearing, illustrating in dotted lines the dies used for the final step of assembly in cooperation with the cages;

Figure 19 is a view similar to Figure 18 showing the cages as finally formed (one die finger being illustrated in dotted lines);

Figure 20 is an end view of said bearing;

Figure 21 is a sectional view in line 21—21 of Figure 18;

Figure 22 is a sectional view on line 22—22 of Figure 19; and

Figure 23 is a diametral section through a roller bearing similar to that shown in Figures 1 and 2 with the cage shown in Figure 15.

Referring to Figures 1, 2 and 4 to 11 of the drawings, the improved bearing may comprise an inner race 10, an outer race 11, rollers 12, 12 and a two-part cage, the parts of which are designated 13 and 14 respectively. In this bearing both guiding and pressure ribs are on the inner race. The pressure rib is at 10a and the guiding rib at 10b. Clearance is indicated at 10c. In practice this clearance is as low as possible being just sufficient to permit radial insertion of the rollers between the ribs so that the rollers may rock out of their normal axial positions to a very slight extent.

Referring especially to Figures 8, 9 and 10, both end faces of the rollers and the ribs then engaged are formed so that a central radial rib-roller contact is provided. This may be accomplished by forming both end faces of the rollers with convex-conical surfaces as shown or by forming large end faces of rollers convex-conical and small end faces of rollers slightly concave conical as permitted by the inclination and curvature of rib roller surface, the inner walls of the ribs being formed at angles corresponding to that of an element of each convex conical surface. This insures a central radial roller-rib contact on both ribs (see Figures 9 and 10) and causes the lubricant to be carried, in fact, wedged in, between the end faces of the rollers and the rib as the bearing races rotate relatively. Even though there is slight rocking of the rollers out of line between the ribs the roller-rib contacts at both end faces of the roller will be centrally of the adjacent roller-rib surfaces and not at the edges of the roller. This effectually prevents scoring. The relatively high ribs provide for sufficient radially extending contact areas centrally of the rolls to give the required load-sustaining and roller-guiding qualities to the bearing. As shown in Figure 11, the invention also permits finishing of the races by a single inexpensive grinding operation, both inner rib surfaces and the race surface being formed in a single operation.

Figure 3 shows the invention embodied in a bearing with both the ribs on the outer race. In this bearing the inner race is at 20, the outer race at 21 and the rollers 22, 22.

Figure 12 shows the invention embodied in a bearing having one rib on each race, the inner race being designated 30, the outer race 31 and the rollers 32.

In Figures 1 to 7, an improved cage embodying one form of the invention is illustrated. It will be apparent that this type of bearing requires a different mode of assembly because of the high ribs. The rollers may not be assembled in the cage pockets, engaged over the inner race and the cage constructed in the usual way. The particular cage shown in Figures 1 to 7 is constructed of the two parts 13 and 14 to be assembled with the bearing after assembly of the rollers in the inner and outer race.

The parts 13 and 14 each constitutes an annulus formed with tapered fingers 13ᵃ and 14ᵃ respectively, the edges of which are formed as at 13ᵇ and 14ᵇ to conform with the adjacent surfaces of the rollers. The inner cage annulus 13 is of such diameter as to lie within the circle of the centers of the large end faces of the rollers with the fingers thereof substantially extending through the circle of the centers of the small end faces of the rollers. The outer cage annulus 14 is of such diameter as to circumscribe the circle of centers of the small end faces of the rollers with the fingers thereof substantially passing through the circle of the centers of the large end faces of the rollers. Cage part 13 is inserted from one side and cage 14 from the other and the two cage parts are secured together as by welding or riveting the ends of the fingers of each to the annulus of the other.

Figures 13 to 22 illustrate the invention as embodied in a double opposed roller bearing. The numeral 40 designates the inner race, the numeral 41 the outer race and the numerals 42, 42 the rollers. The inner and outer races may be placed in eccentric relation as shown in Figures 13 and 14, the rollers assembled therein as shown in Figure 14 and one-piece cages 43, 43 may be employed.

The one-piece cages 43 comprise inner and outer rings 43ᵃ and 43ᵇ and cantilever fingers 43ᶜ comprising loops of metal connecting rings 43ᵃ and 43ᵇ and extending axially and slightly inwardly to one side of said rings. The inner end faces of said fingers are formed with reversely bent portions 43ᵈ which permit elongation of the fingers when assembled with the bearing to draw the sides of the loop together about the rollers of the bearing. These fingers are so designed that their axes diverge from the axes of the rollers sufficiently to permit insertion of the fingers between the inner and outer races and between the large end faces of the rollers.

The cages 43 are assembled with the bearing 40, 41, 42 as shown in Figure 18 and dies indicated at 44, 44 having pivoted elements 45, 45, the end faces of which are inserted into the fingers as shown, are utilized to deform the reversely bent portions 43ᵈ of the fingers to elongate the fingers and draw the sides of the loops together about the rollers and to deform the fingers inwardly so that the axes of the fingers are substantially in the cone of the axes of the rollers (Figure 19). This effectively secures the cages and the several parts of the bearing together. As shown in Figures 16, 21 and 22, the edges of the fingers are so designed as to conform to the surfaces of the rollers when the fingers are formed to final shape in the assembly of the bearing.

As indicated in Figure 23, a cage 43 may be used with a single roller bearing including an inner race 50, an outer race 51 and rollers 52, 52.

In all forms of the invention the rollers preferably fit in the raceways with just sufficient clearance to permit insertion into the races before assembling the cage and with comparatively high ribs which would prevent axial assembly of the rollers and cage with the race. In all forms of the invention both end faces of the rollers are designed to contact with the ribs centrally of the adjacent rib roller faces with single radial contacting areas whereby the lubricant film is effectively worked in between the end faces of the rollers and the ribs and whereby no sharp edges of the rollers will cut through the lubricant film and score the bearings, and whereby roller end faces rotate against rib roller surfaces.

It will be seen that by the bearing construction disclosed herein the function of keeping the rollers in alignment is performed by both raceway ribs by reason of the almost negligible clearance between roller-end faces and rib sides. The important point is to maintain this minimum clearance and so preserve the roller alignment and thus the proper functioning of the bearing for an indefinite period which means that wear on roller-end faces and corresponding rib sides must be practically eliminated. This prevention of wear is effected by the provision of conical surfaces on the roller-end faces and the rib sides and the limitation of roller skewing action so as to maintain central radial rib contact on the roller-end faces at all times which prevents the presentation of the roller edges to said ribs to cut through the lubricant and cause rapid rib wear. Such central radial contact on conical surfaces provides for substantially a perfect rolling action with little or no rubbing or sliding and, therefore, no substantial wear between the roller-end faces and rib sides as compared to the substantial sliding of the prior types of roller-end faces across the rib faces. High raceway ribs are also important as a means of obtaining low unit pressures on roller-end faces but to obtain such feature it is necessary to develop a cage construction which will permit of assembly of the rollers on the raceways first and applications of the cage afterwards. It is also particularly important to eliminate any possibility of the roller-end faces rubbing the ends of the cage pockets by providing that the cage shall contact only on the sides of the rollers both inside and outside of the roller center line. This is obtained in two types of cages disclosed herein.

Both types of cages permit formation of races in single type roller bearings with integral ribs and the cantilever finger cage particularly permits formation of a double opposed roller bearing with integral ribs on the races simply and economically.

Modifications of the invention other than those disclosed herein may be resorted to without departing from the spirit thereof or the scope of the appended claims.

I claim:

1. A tapered roller bearing comprising inner and outer races with roller retaining ribs, rollers between the races and between the ribs, and a cage, said cage comprising two parts each consisting of an annulus with axially extending fingers shaped to conform to the surfaces of the rollers, one annulus lying within the circle of centers of the large end faces of the rollers and arranged on that side of the bearing at which the large end faces of the rollers are located with its fingers substantially passing through the circle of centers of the small end faces of the rollers, the other annulus circumscribing the circle of centers of the small end faces of the rollers and arranged on that side of the bearing at which the small end faces of the rollers are located with its fingers substantially passing through the circle of centers of the large end faces of the rollers, the ends of the fingers on each annulus being secured to the other annulus.

2. In a tapered roller bearing, inner and outer races having conical raceways defined by ribs on one or both races, tapered rollers on said raceways, the large and small end faces of which are both conical, the sides of said ribs adjacent said end faces being inclined to correspond to elements of said conical end faces and the clearance between the roller end faces and ribs being such that skewing of rollers is closely limited by the cooperating rib sides, the roller rib contacts being substantially radially in line with the centers of the roller end faces.

3. In a tapered roller bearing having inner and outer concentric races formed with conical raceways and defined by ribs on one or both races, tapered rollers between the races, one or both ribs being of such height and the clearance between the roller end faces and ribs being so slight that a cage may not be axially assembled with the rollers in position in cage sockets, and a cage having two circumferential series of roller-separating fingers, one series being radially inside those of the other and said fingers being substantially parallel to the main axis of the bearing.

4. In a tapered roller bearing having inner and outer concentric races having conical raceways defined by ribs at the sides thereof, tapered rollers between the inner and outer races, one or both of said ribs being of such height that a cage may not be assembled axially with the assembled rollers, and a cage comprising two parts permanently fastened together, each part consisting of an annulus, one on each side of the bearing with axially extending fingers, each annulus being concentric but out of alignment with the circle of the centers of the end faces of the rollers such that the sides of the axially extending fingers will embrace diagonally the sides of the rollers.

5. In a tapered roller bearing, inner and outer races formed with conical raceways defined by ribs at the sides of the bearing and having tapered rollers therebetween, a cage comprising two parts fastened together, each part consisting of an annulus with axially extending fingers and with the fingers of each part fastened to the annulus of the other part, the sides of the fingers being so formed as to embrace diagonally the sides of said rollers inside and outside the center lines of said rollers, effecting location of the cage axially and effecting radial guidance to prevent wearing of said cage against the end faces of the rollers.

6. In a tapered roller bearing having conically inclined rollers between inner and outer raceways, one of said raceways having relatively high ribs preventing assembling the rollers in the cage and axial assembly of the rollers and cage with said race, said cage consisting of two parts fastened together in the form of rings one inside another, each part consisting of an annulus with axially extending fingers with fingers of each part engaging the annulus of the other, the sides of said fingers diagonally embracing the sides of said rollers both inside and outside of the center lines of said rollers, said fingers being wider where they join the annulus than at the ends permitting easy assembly by axial insertions of fingers after rollers have been arranged around the race.

7. That method of assembling tapered roller bearings which comprises preforming a cage with inner and outer rings adapted to be arranged at one side of the bearing and with cantilever fingers comprising loops between said rings and extending axially thereof with the ends of the loops having reversely bent portions, assembling a bearing with inner and outer races with conical raceways and tapered rollers therebetween, inserting the fingers of the cage between the races and between the rollers from that side of the bearing at which the large end faces of said rollers are located and deforming the fingers and the reversely bent portion thereof so that said loops are elongated and converged closely to embrace said rollers and to embrace the inner race.

8. That method for assembling tapered roller bearings which comprises preforming a cage with an annulus adapted to be arranged at one side of the bearing and with axially extending roller separating fingers, assembling a bearing with inner and outer races having conical raceways and tapered rollers therebetween, inserting the fingers of said cage between the races and between the rollers from that side of the bearing at which the large end faces of the rollers are located, and deforming said fingers whereby they will converge closely to embrace the sides of the rollers and to embrace the inner race.

9. A tapered roller bearing comprising inner and outer races including spaced ribs of such height as to prevent axial assembly of rollers and a cage therewith, rollers between said races and between said ribs, the clearance between the rollers and ribs being just sufficient to permit radial assembly of the rollers between said races, both the large and small end faces of said rollers being conical and the inner sides of said ribs being at angles respectively corresponding to those of elements of said conical surfaces whereby said rollers contact said ribs at radial areas centrally of the adjacent rib-roller faces, the conical forms of the roller-end faces and the said clearance being such that the rollers may not become skewed to present edges thereof to the guiding or load-sustaining surfaces of said ribs, and a cage for holding said rollers in spaced relation about said bearing, said cage being provided with roller separating fingers parallel to the axis of the bearing and adapted to be inserted axially between the races and rollers after assembly of the same.

10. A tapered roller bearing comprising inner and outer races including spaced ribs of such height as to prevent axial assembly of rollers and a cage therewith, rollers between said races and between said ribs, the clearance between the rollers and ribs being just sufficient to permit radial assembly of the rollers between said races, both the large and small end faces of said rollers being conical and the inner sides of said ribs being at angles respectively corresponding to those of elements of said conical surfaces whereby said rollers contact said ribs at radial areas centrally of the adjacent rib-roller faces, the conical forms of the roller-end faces and the said clearance being such that the rollers may not become skewed to present edges thereof to the guiding or load sustaining surfaces of said ribs, and a cage for holding said rollers in spaced relation about said bearing, said cage being provided with roller separating fingers, said cage comprising two parts each consisting of an annulus with axially extending fingers shaped to conform to the surfaces of the rollers, one annulus lying within the circle of centers of the large end faces of the rollers and arranged on that side of the bearing at which the large end faces of the rollers are located with its fingers substantially passing through the circle of centers of the small end faces of the rollers, the other annulus circumscribing the circle of centers of the small end faces of the rollers and arranged on that side of the bearing at which the small end faces of the rollers are located with its fingers substantially passing through the circle of centers of the large end faces of the rollers, the ends of the fingers on each annulus being secured to the other annulus.

HARRY E. WISE.